US005784376A

United States Patent [19]

Le Gall

[11] Patent Number: 5,784,376
[45] Date of Patent: Jul. 21, 1998

[54] ADAPTIVE BURST MULTIPLEXING SYSTEM USING DYNAMIC DEADLINE COMPUTATION

[75] Inventor: Jean-Yves Le Gall, Lafitte-Vigordane, France

[73] Assignee: Alcatel N.V., Rijswijk, Netherlands

[21] Appl. No.: 570,856

[22] Filed: Dec. 12, 1995

[30] Foreign Application Priority Data

Dec. 13, 1994 [FR] France ................ 94 15001

[51] Int. Cl.$^6$ .................................... H04J 3/16
[52] U.S. Cl. ................. 370/460; 370/462; 370/463
[58] Field of Search ........................ 370/310, 315, 370/316, 319, 321, 322, 323, 325, 442, 443, 449, 450, 451, 452, 458, 459, 460, 462, 463, 419, 437, 537

[56] References Cited

U.S. PATENT DOCUMENTS

| | | | |
|---|---|---|---|
| 4,002,842 | 1/1977 | Meyr et al. | 370/452 |
| 4,596,013 | 6/1986 | Tshiro et al. | 370/452 |
| 4,855,999 | 8/1989 | Chao | 370/538 |
| 5,003,533 | 3/1991 | Watanabe | 370/475 |
| 5,107,490 | 4/1992 | Wilson et al. | 370/452 |
| 5,274,625 | 12/1993 | Derby et al. | 370/389 |
| 5,467,352 | 11/1995 | Cidon et al. | 370/452 |
| 5,499,247 | 3/1996 | Matsuda et al. | 370/445 |

FOREIGN PATENT DOCUMENTS

0450974A2  10/1991  European Pat. Off. .
0494018A1  7/1992   European Pat. Off. .

OTHER PUBLICATIONS

Yoshinori Saki, "Burst Multiplexing Method of Multimedia Signals by Communication Terminal," *Electronics & Communications In Japan, Part I—Communications*, vol. 73, No. 2, Part 01, Feb. 10, 1990, pp. 53–63, XP000140240.

Delli Priscoli F et al. "A Distributed Access Protocol for an ATM–Oriented Satellite System". ICC 89, Boston. Jun. 11–14, 1989, vol. 2 of 3, Jun. 11, 1989, *Institute of Electrical and Electronics Engineers*, pp. 690–694, XP 000075232.

*Primary Examiner*—Benedict V. Safourek
*Assistant Examiner*—Seema S. Rao
*Attorney, Agent, or Firm*—Sughrue, Mion, Zinn, Macpeak & Seas, PLLC

[57] ABSTRACT

An adaptive burst multiplexing system using dynamic deadline computation serializes data from source units. It comprises interface circuits for accumulating in a buffer memory a quantity of data from a corresponding source unit. An empty frame generator circulates a series of frames around a ring through the interface circuit. Each interface circuit computes a deadline beyond which its buffer memory may become saturated and places this deadline in a passing empty frame. When this frame returns to the frame generator it contains the identifier of the interface circuit that put in it the earliest deadline. The generator transmits an empty frame over the ring with the identifier of this interface circuit which then recognizes its authorization to transfer data accumulated in its memory.

4 Claims, 4 Drawing Sheets

ADAPTIVE BURST MULTIPLEXING SYSTEM USING DYNAMIC DEADLINE COMPUTATION

BACKGROUND OF THE INVENTION

1. Field of the Invention

The invention concerns digital data multiplexing systems, in particular for use in a digital data acquisition installation on board a satellite.

2. Description of the Prior Art

A digital data acquisition installation on board a satellite is described in European patent application No 0 494 018.

A satellite is normally equipped with a number of instruments such as optical instruments, radar instruments, etc to measure physical phenomena and to transcribe these measurements into digital data conventionally made up of streams of bits.

However, some instruments generate a relatively large number of measurement bits in a given time interval while others generate a relatively small number of bits in the same time interval. In other words, the data rates vary from one instrument to another, possibly to a considerable degree. Also, there is not usually any reason for the different streams of data to be synchronized with each other.

The bit streams from the various instruments have to be formatted, i.e. it is necessary to associate a series of 8000 bits, for example, representing measurement data with bits placed at the start to enable earth stations that subsequently receive the measurement data to identify the origin of the bit streams. For example, there is a particular number of bits to identify the measuring instrument that is the origin of the bit stream, a few more bits to indicate the length of the bit stream, other bits to identify the satellite from which the measurement originates, etc.

The satellite multiplexes or concatenates the various bit streams for immediate or subsequent serial transmission and for routing to various output interfaces, for example to different radio transmitters and/or to different recording devices.

If the number of instruments is large, multiplexing data from non-synchronized instruments with varying data rates can require very large storage capacities and/or generate very high bit rates within the multiplexer. These storage capacities and bit rates can be incompatible with the link quality and reliability constraints typical of space missions.

The process used to minimize the storage capacity and the internal bit rates consists in defining within the multiplexer a sequence for interrogating the various instruments according to the various input and output data rates and in transferring the data from each instrument directly to the multiplexer in accordance with this sequence. A process of this kind has the drawback of requiring a large number of electrical connections between each source and the multiplexer. To overcome this drawback the digital data acquisition installation described in the document mentioned above includes a multiplexing system adapted to generate a series of empty frames in which there are no data bits. Each frame passes in succession through the interface circuits of the instruments on the satellite from which data is to be acquired, so that it can be at least partially filled with data accumulated and pre-formatted by one of these instruments. When an instrument recognizes the possibility of transferring its data into an empty frame, it fills the frame with at least some of its data. Otherwise it forwards the empty or full frame to the next instrument.

Full frames are routed from the output of the last instrument to the output interfaces. In this multiplexing system the instrument with the highest data rate is the first to receive each empty frame generated and the instrument with the lowest data rate is the last to receive this frame (the frame may still be empty by this time). A multiplexing system of this kind operates optimally in terms of transmission capacity if each instrument has a constant bit rate during the multiplexing process Satellites also carry instruments with operating modes that vary according to observation or measurement conditions. For example, the next generation of optical instruments on board satellites will be equipped with variable bit rate digital image data compression algorithms. As a result, some instruments will have a bit rate that varies over a considerable range within a given time interval, i.e. during the multiplexing process.

The multiplexing system described above is not able to adapt automatically to variations in the bit rate at the output of an instrument unless the transmission capacity of the multiplexing system is uprated, which can lead to problems as mentioned above.

An aim of the invention is therefore to propose a multiplexing system suitable for a satellite data acquisition installation capable of adapting automatically to variations in the bit rate at the output of instruments of the satellite and operating optimally in terms of transmission capacity without being uprated relative to the sum of the bit rates produced by the instruments.

SUMMARY OF THE INVENTION

To this end, the invention consists in a multiplexing system for serializing data bursts from different source units, comprising respective interface circuits associated with said source units and each having a buffer memory adapted to accumulate temporarily a particular quantity of data from said source unit, an empty frame generator adapted to transmit a series of empty frames around a ring to which said interface circuits are connected so that each empty frame passing in succession through said interface circuits can be filled with a data burst taken from said buffer memory of one of said interface circuits, each interface circuit being assigned frames on said ring in advance and any frame filled with data at the output of the last interface circuit connected to said ring being returned to said frame generator, wherein said empty frame generator is adapted to generate and to transmit over said ring a first empty frame containing a first header area containing a predetermined reference deadline, each interface circuit is adapted to compute a local deadline beyond which its buffer memory is likely to become saturated from a time at which its buffer memory has already reached a particular fill level, recover said reference deadline contained in said first header area of a passing frame, replace said reference deadline in said first header area of said frame with its local deadline if the latter is the earliest and entering an identification code specific to it into a second header area of said frame before forwarding said frame over said ring, in response to receiving a frame including an interface circuit identification code in its second header area, said empty frame generator transmits over said ring an empty frame containing in said first header area said reference deadline and in a third header area said identification code recovered from said second header area of said frame it has received, and each interface circuit is adapted to fill a passing empty frame with a burst of data accumulated in its buffer memory if said empty frame contains in said third header area a code corresponding to its own identification code.

This multiplexing system comprises interface circuits adapted to accumulate in a first buffer memory a certain amount of data from a corresponding source unit. An empty frame generator circulates a series of frames around a ring passing through the interface circuits. Each interface circuit is adapted to compute a deadline beyond which its buffer memory is likely to become saturated and to deposit this deadline in a passing empty frame. When this frame returns to the frame generator it includes the identification of the interface circuit that deposited the earliest deadline. The generator places on the ring an empty frame carrying the identifier of the interface circuit concerned, which recognizes this authorization to transfer data accumulated in its memory.

The invention also includes a satellite digital data acquisition installation incorporating a multiplexing system of this kind.

Other features and advantages of the invention will emerge from the following description of one embodiment of the invention.

DETAILED DESCRIPTION OF THE PREFERRED EMBODIMENTS

Figure 1:
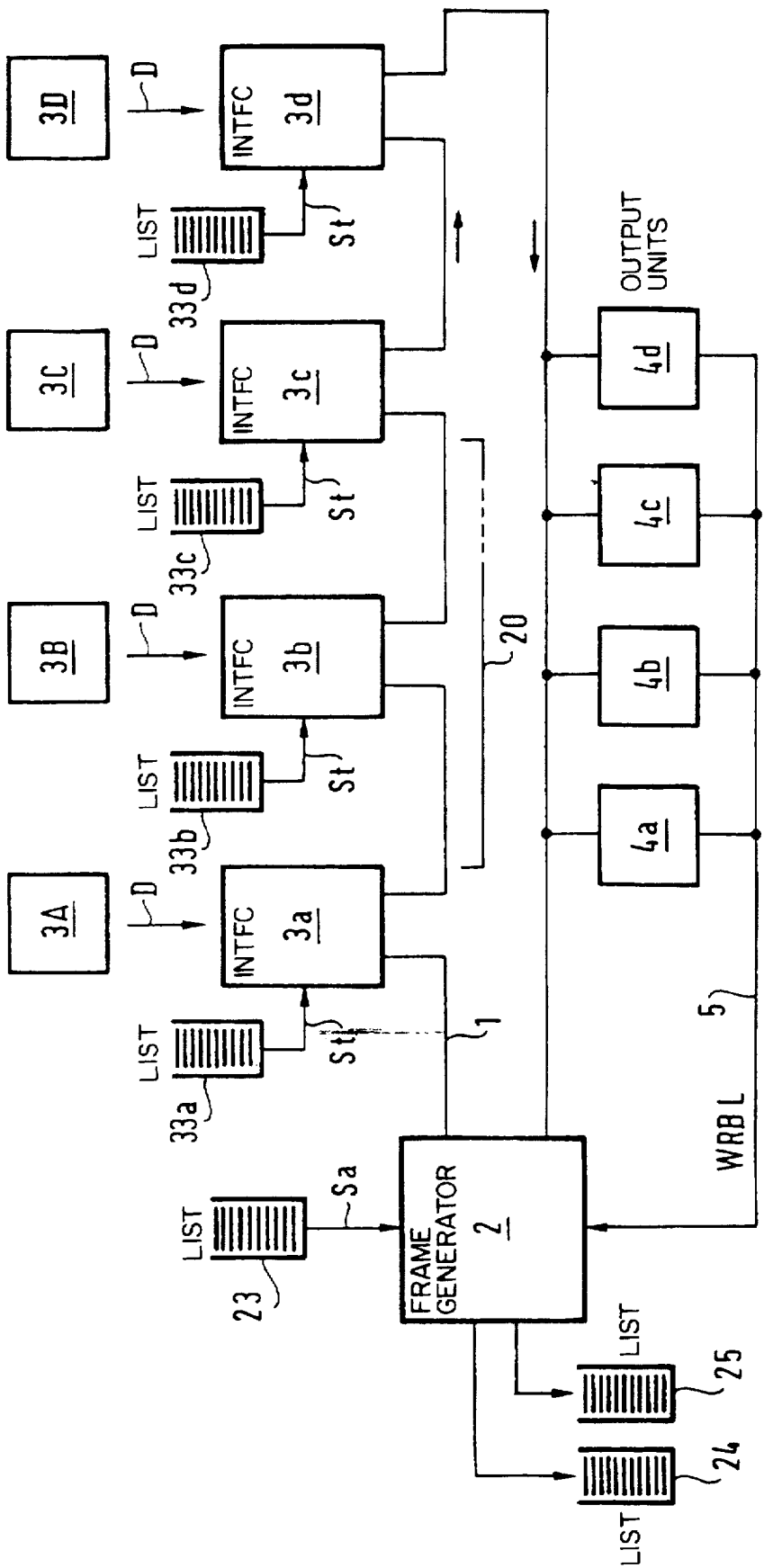
FIG. 1 shows the architecture of a satellite digital data acquisition installation comprising a multiplexing system of the invention.

Referring to FIG. 1, the digital data acquisition installation comprises a plurality of data capture and digitization units 3A–3D, such as optical, radar and other instruments as usually installed on board a satellite.

These units are under the control of a control unit (not shown) that activates them for a given time interval which usually corresponds to a data acquisition session.

When activated the units operate asynchronously and produce in parallel a plurality of streams of digital data D at different and varying bit rates The installation also comprises a ring 1 wired in a ring from a frame generator 2 and passing in succession through interface circuits 3a–3d of the data capture units 3A–3D. This ring can be a high bit rate serial link, its bit rate being only slightly greater than the sum of the peak output bit rates of the units 3A–3D. In practise it is defined by programming a switching matrix for connecting it selectively to some of the interface circuits.

The frame generator 2 is part of a time-division multiplexing system and generates a continuous stream of empty frames 20 in which there are no data bits. It places them one after the other on the ring.

Accordingly, each empty frame 20 in which there are no data bits passes in succession through the interface circuits 3a–3d where it can be filled with data bits D from a data capture unit, in this example a burst of 1280 bytes, which also defines the size of a frame 20.

From the output of the last interface circuit each empty or full frame returns to the empty frame generator 2, having passed right around the ring.

Figure 2:
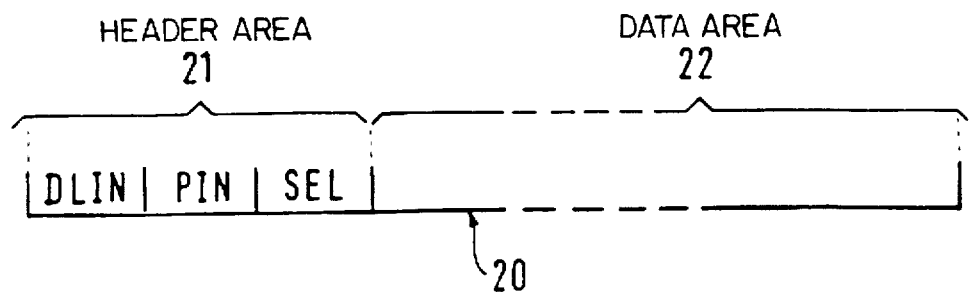
FIG. 2 shows the structure of the frame used by the multiplexing system of the invention.

Referring to FIG. 2, each frame includes a header area 21 and a data area 22. The header area 21 comprises a first series of control bits DLIN, a second series of control bits PIN and a third series of control bits SEL the function of which is explained below.

The frame generator 2 operates in accordance with the following algorithm. At the start of a data acquisition session it places on the ring a first frame 20 called the canvassing frame having a data area 22 in which there are no data bits and a header area 21 containing the series of bits DLIN representing a particular reference deadline DLREF. This deadline DLREF is much greater than the value of any deadline computed by an interface circuit, as explained below. In this example the series of bits DLIN includes eight bits. The second series of bits PIN in the header area of the canvassing frame is used to code a series of interface circuit identifiers. In this example the series of bits PIN comprises four bits, each bit in the series at binary 1 being representative of one of the four interface circuits. In the canvassing frame the bits of the series of bits PIN are set to binary 0 so that this series of bits PIN codes a series in which there are no identifiers. The third series of bits SEL of the header area is used to code an interface circuit identifier. In this example, this series of bits SEL comprises four bits, the bit at binary 1 representing one of the interface circuits. In the canvassing frame the series of bits SEL has all its bits at binary 0.

The canvassing frame passes in succession through the interface circuits. As it passes through an interface circuit the latter scans the content of its header area and if necessary carries out processing described below. From the output of the last interface circuit (the circuit 3d in FIG. 1), the canvassing frame returns to the circuit 2. The latter responds by generating a new frame 20, called a transfer frame, which passes around the ring in the same circuit as the canvassing frame, with the result that successive transfer frames pass in succession around the ring 1 and return to the frame generator in an uninterrupted stream.

On receiving a frame 20, whether it is the canvassing frame or a transfer frame, the frame generator 2 operates in accordance with the following algorithm (see FIG. 4):

decode (40) the header area of the frame to recover the series of bits PIN;

compare (41) the series of bits PIN with the word "0000" to detect the presence of one or more interface circuit identifiers (in this example, one or more bits at binary 1);

if at least one interface circuit identifier is present in the series of bits PIN (i.e. if at least one bit in the series is at binary 1), then send (42) a new empty frame over the ring 1 with, in the header area, a series of bits DLIN coding the deadline DLREF, an empty series of bits PIN in which there are no interface circuit identifiers (i.e. all the bits of the series PIN are at binary 0), a series of bits SEL coding a single interface identifier if at least one identifier was present in the list coded by the series of bits PIN (one bit (X) of the series of bits SEL at binary 1);

otherwise, send (43) a new empty frame around the ring 1 with, in the header area, a series of bits DLIN coding the deadline DLREF, a series of bits PIN with all its bits at binary 0 and a series of bits SEL with all its bits at binary 0.

Each interface circuit (generically labelled 3 in FIG. 3) includes an FIFO buffer memory 30 which accumulates a series of data bits D produced by a data capture unit. In practise the capacity C of the buffer memory must be sufficient to accumulate data bits for two passes of a frame around the ring without overflowing.

Figure 3:
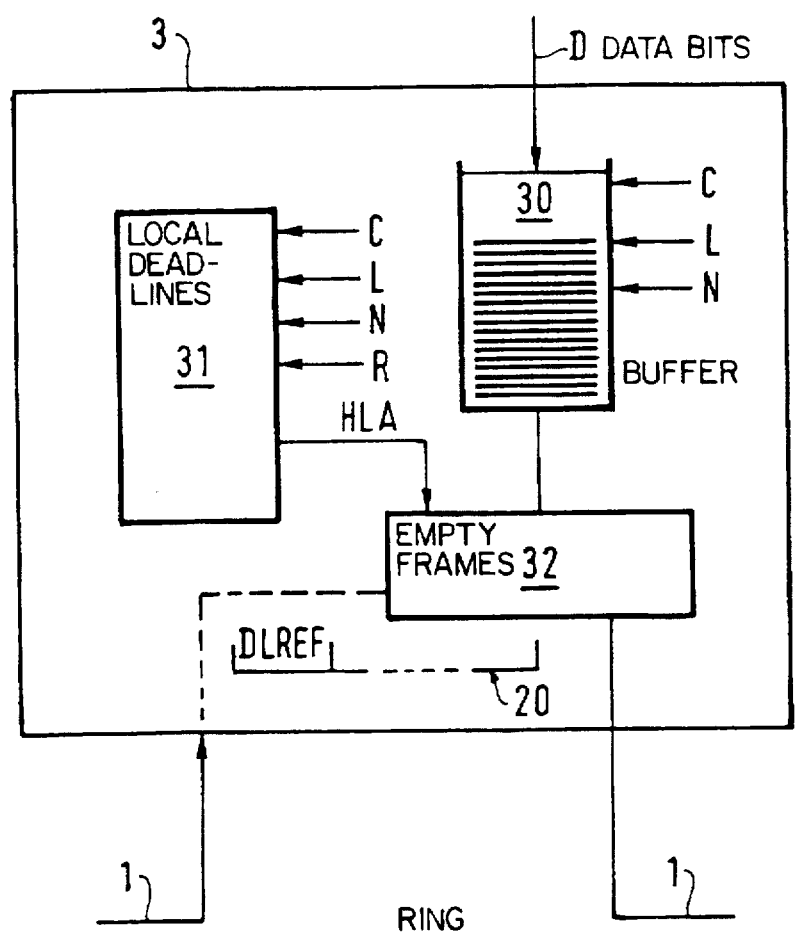
FIG. 3 is a block schematic of an interface circuit of the multiplexing system of the invention.

Referring to FIG. 3, the interface circuit includes two separate processing units, a unit 31 for computing a local deadline and a unit 32 for manipulating empty frames.

Figure 5:
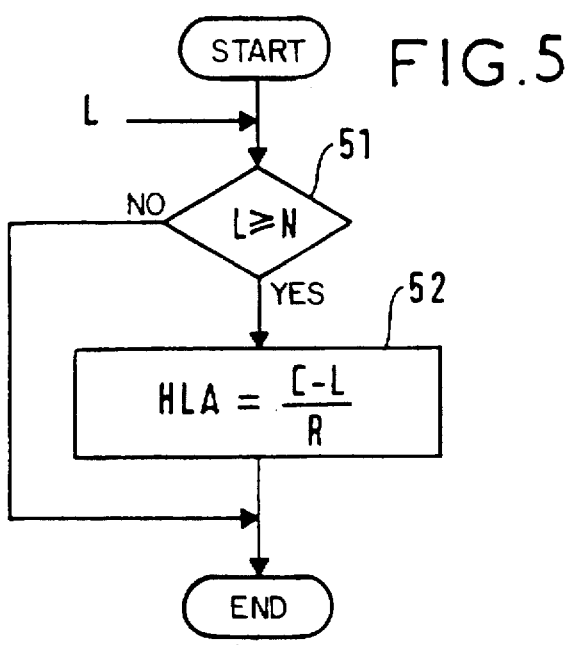
FIGS. 5 and 6 show the operation of an interface circuit for implementing the multiplexing process of the invention.

The unit 31 operates in accordance with the following algorithm (see FIG. 5). If (51) during real time management of the buffer memory 30 the fill level L reaches a particular value N, for example 1 280 bytes, then compute (52) a local deadline HLA from the following equation:

$$HLA=(C-L)R$$

where R is the bit rate at which the data D produced by the instrument in question enters the buffer memory 30. This input bit rate can be predetermined and in this case constitutes the maximal bit rate of the instrument. It can instead be measured cyclically if the interface circuit 3 includes bit rate measuring means.

The local deadline HLA can be computed in real time, for example each time a new item of data is acquired in the buffer memory 30 and/or each time an empty frame passes through the interface circuit in question. It is not computed if the fill level L of the buffer memory is below the value N.

Figure 6:
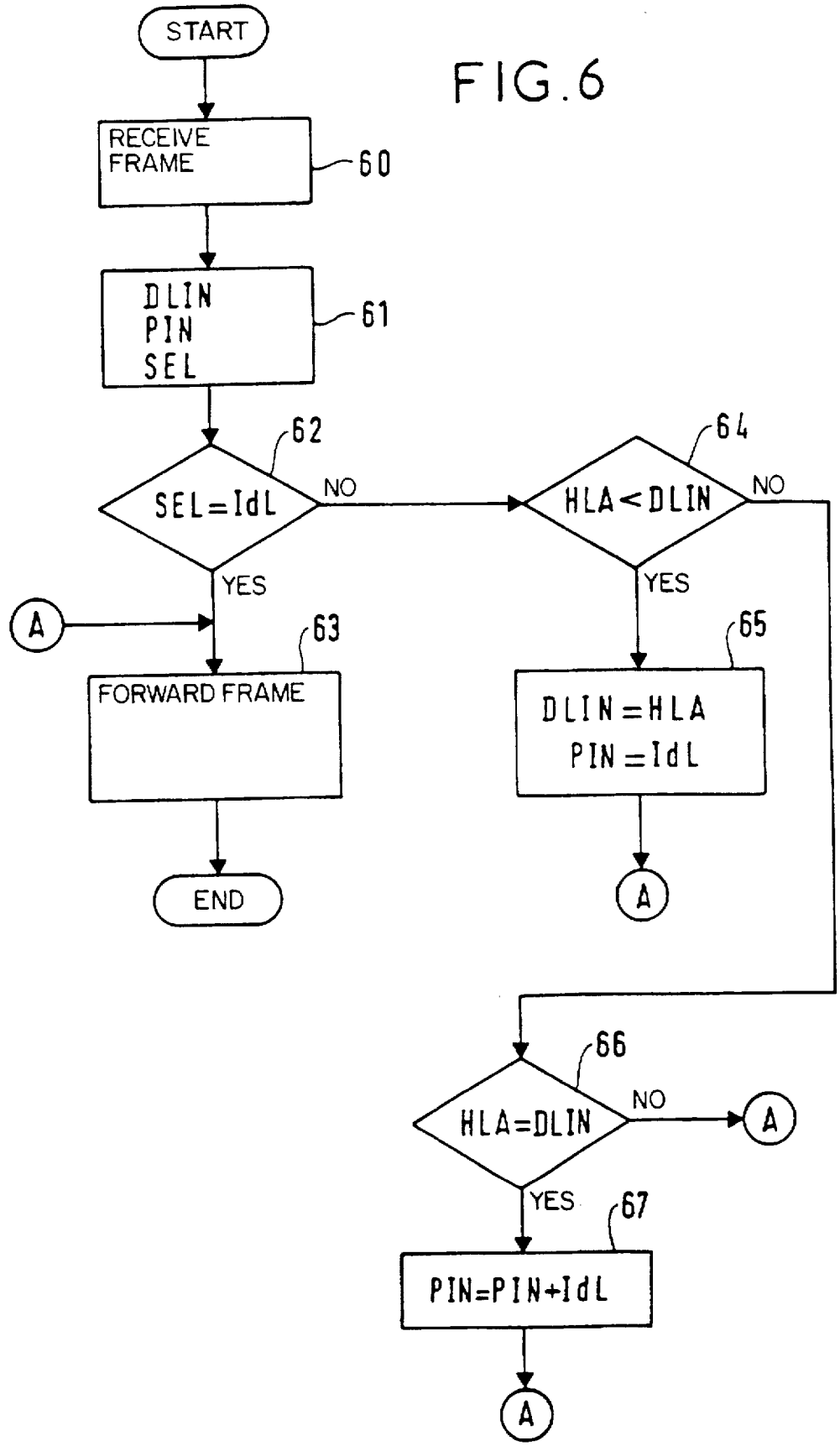

The processing unit 32 operates in accordance with the following algorithm (see FIG. 6). On detecting (60) an empty frame 20 containing no data bits:

decode (61) the header area of the frame to recover the series of bits DLIN, PIN and SEL;

compare (62) the series of bits SEL to a local interface circuit identifier IdL; in this example the local identifier is a four-bit word in which one bit is at binary 1, this bit representing one interface circuit;

if the series of bits SEL is identical to the local identifier IdL (i.e. if the header area of the empty frame contains the local identifier IdL of the interface circuit), then fill (63) the empty frame with the bits of a data burst taken from the buffer memory 30 before forwarding the frame on the ring;

if the series of bits SEL is not the same as the local identifier IdL (i.e. if the header area of the frame does not contain the interface circuit IdL), then compare (64) the series of bits DLIN with the local deadline HLA computed by the interface circuit if the latter is present when the frame passes through the interface circuit;

if HLA is less than the series of bits DLIN, then code (65) the local deadline HLA in the series of bits DLIN, code the series of bits PIN to enter only the identifier IdL of the interface circuit in the series of interface circuit identifiers and forward the frame on the ring;

if HLA is equal to the series of bits DLIN (66), then code (67) the series of bits PIN to enter the identifier IdL of the interface circuit after the series of interface circuit identifiers and forward the frame on the ring;

otherwise forward the frame on the ring without modifying its header area.

The processing as just described is carried out in exactly the same way for each instrument interface circuit 3a–3d. The first interface circuit on the ring, that nearest the frame generator 2, always recovers the deadline DLREF from the series of bits DLIN. The comparison (64) in FIG. 6 is therefore effected if this deadline DLREF is set to a value much greater than any local deadline HLA computed by the interface circuit 3a.

If more than one interface circuit has computed a local deadline at the time an empty frame passes through it, at the output of the last interface circuit this frame will have in its header area a series of bits DLIN coding a local deadline computed by at least one of the interface circuits, this deadline being the earliest one, and a series of bits PIN coding a series of interface identifiers containing at least the identifier IdL of the circuit(s) that computed this earliest local deadline.

When this frame is received by the frame generator 2, the latter sends out a new frame having in the header area a series of bits SEL coding only the identifier of the interface circuit that computed the earliest local deadline in the previous pass of the frame around the ring. When it receives this new frame, that interface circuit recognizes its local identifier in the series of bits SEL in the header area of the frame and can dump at least part of the contents of its buffer memory, constituting a burst of accumulated data, in this new empty frame.

At the end of a recording session the control unit forces the interface circuits to dump their buffer memory completely in a particular sequence.

Thus the fixed length data burst time-division multiplexing system of the invention places in series on the ring 1 successive data bursts taken one after the other from the buffer memories in an order based on the dynamic computation of local deadlines enabling it to adapt automatically to variations in the bit rates of the sources consisting in the data capture units of the satellite.

In practise, if the sum of the output bit rates of the data capture units is close to the bandwidth of the multiplexing system, at the output of the last interface circuit, which is the interface circuit 3d in this example, each frame has a data area 22 filled with data bits and a header area 21 containing a local deadline computed by one of the interface circuits and the identifier of that interface circuit; in this way all of the bandwidth of the multiplexing system is used.

The installation shown in FIG. 1 includes output units 4a–4d connected to the ring, for example radio transmitters or recording devices.

These output units can be assigned to respective data capture units and in this case each output unit is programmed to recognize in each frame it receives that is full of data the local identifier IdL of an interface circuit coded in the series of bits SEL of the header area of that frame, in order to recover the data contained in the frame for subsequent formatting.

The output units 4a–4d of the data acquisition installation of the invention are advantageously memory cards shared by the data capture units to store the data that they produce.

Each frame filled with data has in its header area further series of bits for coding at least two addresses Sa, St.

The first address Sa is taken from a list 23 of addresses established at the start of a recording session, for example by the control unit. These addresses are used or recycled by the empty frame generator circuit 2 as described below. The addresses Sa from the list 23 are the addresses of memory locations on the memory cards.

The interface circuits use respective lists 33a–33d of addresses St established at the start of a recording session, for example by the control unit. The addresses in the lists 33a–33d of addresses are addresses of second memory locations different from the first memory locations. Each interface circuit has a list of a sufficient number of addresses St for storing data bursts produced by its instrument, for example one address St per data burst to be stored.

Figure 4:
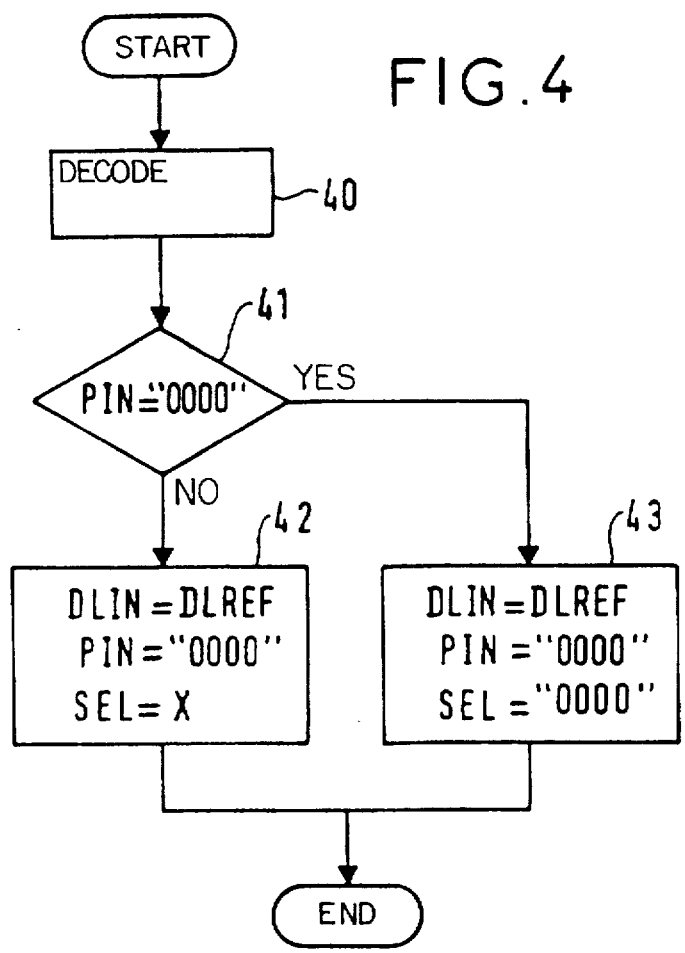
FIG. 4 shows the operation of a frame generator that is part of the multiplexing system of the invention.

In step 42 in FIG. 4 the empty frame generator takes an address Sa from the list 23 and codes it in the header area of the empty frame generated.

In step 63 in FIG. 6 an interface circuit, for example the interface circuit 3a, takes an address Sa from its list of addresses 33a and codes it in the header area of the frame that it fills with data bits.

Each frame filled with data bits is broadcast to all the memory cards connected to the ring 1. Each of the latter, recognizing the addresses Sa and/or St coded in the header area of the frame, is able to recover the data bits from the frame and store them, firstly at a first location identified by the address Sa and secondly at a second location identified by the address St; as a result, the data bits of a full frame are at least temporarily duplicated on the memory cards.

After automatic rereading of the memory locations at the addresses Sa and St and bit by bit comparison of their contents to verify the complete success, partial success or failure of the storage operation, the memory cards concerned return a status word WRBL indicating the success or failure of the storage operation to the frame generator 2 via a dedicated link 5 (FIG. 1).

If the status word WRBL indicates total success of the operation to store a data burst at the addresses Sa and St, the frame generator 2 recycles the address Sa into the list 23 and inserts the address St, with additional signature bits if necessary, into a list 24 of memory location addresses that are occupied and can be read.

If the status word WRBL indicates partial success of the operation to store a data burst at the addresses Sa and St (the location at the address St is a "bad" location), the frame generator 2 inserts the address Sa into the list 24 (which means that it cannot be recycled anymore) and the address St in a list 25 of bad memory location addresses.

If the status word WRBL indicates failure of the operation to store a data burst (both memory locations are bad, for example) the frame generator inserts the addresses Sa and St into the list 25 and terminates the recording session.

Temporary duplication of the data on the memory cards enables implementation of a simple security system functioning during the recording session. At the end of a recording session the addresses inserted in the list 24 are grouped together in accordance with the origin of the data to constitute data files each assigned to one data capture unit.

The list 23 of addresses Sa does not usually need to be very long since these addresses are recycled in the event of success of successive operations to store data bursts. It can therefore be established as the addresses Sa are used up.

Each address Sa or St can advantageously comprise the combination of a first address field pointing to a memory granule whose size is a multiple of the size of a data burst and a second address field pointing to a memory segment whose size is that of a data burst, which makes it possible to reduce the number of addresses Sa or St in the lists 23 or 33a–33d if the value of the second address field is generated automatically by the interface circuits. In this case, the value of the second address field can be given by data burst counters controlled by the respective interface circuits, for example.

There is claimed:

1. Multiplexing system for serializing data bursts from different source units, said multiplexing system comprising respective interface circuits associated with said source units, each of said interface circuits having a buffer memory adapted to accumulate temporarily a particular quantity of data from a source unit; an empty frame generator adapted to transmit a series of empty frames around a ring, said interface circuits being connected to said ring, wherein each of said empty frames passing in succession through said interface circuits can be filled with a data burst taken from said buffer memory of one of said interface circuits, each of said interface circuits being assigned at least one of said empty frames on said ring in advance and wherein any of said empty frames filled with data at the output of a last one of said interface circuits connected to said ring is returned to said empty frame generator; wherein said empty frame generator is adapted to generate and to transmit over said ring a first one of said empty frames containing a first header area containing a predetermined reference deadline; each of said interface circuits is adapted to compute a local deadline beyond which its buffer memory is likely to become saturated from a time at which its buffer memory has already reached a particular fill level, recover the reference deadline contained in said first header area of said first one of said empty frames, replace said reference deadline in said first header area of said first one of said empty frames with said local deadline if said local deadline is the earliest and enter an identification code specific to said interface circuit into a second header area of said first one of said empty frames before forwarding said first one of said empty frames over said ring; wherein in response to receiving said first one of said empty frames including an interface circuit identification code in said second header area, said empty frame generator transmits over said ring an second one of said empty frames containing in said first header area said reference deadline and in a third header area said identification code recovered from said second header area of said first one of said empty frames received by said empty frame generator, and each interface circuit is adapted to fill said second one of said empty frames with a burst of data accumulated in its buffer memory if said second one of said empty frames contains in said third header area a code corresponding to said identification code of said interface circuit.

2. System according to claim 1 wherein a local deadline HLA is computed by an interface circuit from the equation HLA=(L−C)/R, where L is a filling level of said buffer memory of said interface circuit, C is a maximum fill level of said buffer memory, and R is the bit rate of a source unit associated with said interface circuit.

3. System according to claim 2 wherein R is a maximum bit rate of said source unit.

4. Satellite digital data acquisition installation including a multiplexing system according claim 1 with data capture units as said data source units and memory cards to which said frames filled with data bits are broadcast, each frame filled with data bits having at the beginning at least first and second addresses that can be recognized by said memory cards, and a security system adapted to store said data bits of each full frame at least temporarily at a first memory location of one of said memory cards pointed to by said first address and at a second memory location of one of said memory cards pointed to by said second address, said system being further adapted to recycle said first addresses for re-use of said first memory locations if said second addresses point to second memory locations recognized as being error-free.

* * * * *